United States Patent [19]

Wooten, Jr. et al.

[11] 4,280,660
[45] Jul. 28, 1981

[54] VECTORABLE NOZZLE

[75] Inventors: William H. Wooten, Jr., Evendale; Donald W. Speir, Cincinnati, both of Ohio

[73] Assignee: General Electric Company, Cincinnati, Ohio

[21] Appl. No.: 67,507

[22] Filed: Aug. 17, 1979

[51] Int. Cl.³ .............................................. B64C 15/04
[52] U.S. Cl. ............................ 239/265.35; 239/265.39
[58] Field of Search ........... 239/127.1, 265.11, 265.19, 239/265.33, 265.37, 265.39, 265.35, 269, 265.41; 244/12.5, 23 D, 110 B, 52; 60/230, 232, 271, 242

[56] References Cited

U.S. PATENT DOCUMENTS

| | | | |
|---|---|---|---|
| 3,897,907 | 8/1975 | Colley | 239/265.39 |
| 3,986,687 | 10/1976 | Beavers et al. | 244/12.5 |
| 3,989,193 | 11/1976 | Vedova et al. | 239/265.35 |
| 4,000,610 | 1/1977 | Nash et al. | 60/230 |
| 4,000,611 | 1/1977 | McCardle et al. | 60/230 |

*Primary Examiner*—Robert B. Reeves
*Assistant Examiner*—Gene A. Church
*Attorney, Agent, or Firm*—Donald W. Walk; Derek P. Lawrence

[57] ABSTRACT

A nonaxisymmetric, variable area, exhaust nozzle is provided with thrust vectoring capabilities in one plane. The nozzle incorporates an upper, thrust vectoring flap to control direction of thrust over various flight conditions, and a lower, area control flap that is pivoted to modify size and location of the nozzle throat. The structural aspects of this nozzle provide a unique capability to vector thrust up to 60 degrees while changing the nozzle throat position to a region downstream of the vectoring of the exhaust gases.

6 Claims, 5 Drawing Figures

VECTORABLE NOZZLE

BACKGROUND OF THE INVENTION

1. Field of the Invention

This invention relates to gas turbine engine exhaust nozzles and, more particularly, propulsion systems of the thrust vectorable variety.

2. Description of the Prior Art

The high velocity imparted to exhaust gases of a gas turbine by an exhaust nozzle provides thrust for propulsion. This thrust is substantially opposite to the direction of flow of exhaust gases exiting the nozzle. Consequently, if direction of the exhaust gases is changed, the direction of propulsive thrust is correspondingly varied.

Typically, aircraft gas turbine engines are provided with nozzles which are fixed in the axial direction, and aircraft maneuvering and lift are accomplished solely by airframe control surfaces. Advanced aircraft configurations contemplate, and may even require, the selective redirection (or vectoring) of gas turbine engine thrust in order to enhance aircraft performance and to provide the aircraft with operational characteristics heretofore deemed impractical. For example, if the exhaust of a conventionally installed aircraft turbine engine is directed downwardly, rather than rearwardly, to a direction substantially perpendicular to the engine longitudinal axis, the resulting upward thrust would provide direct lift for the aircraft and, if properly controlled, a vertical takeoff or short takeoff and landing capability. Similarly, thrust vectoring during flight can greatly increase aircraft maneuverability since the thrust force can augment the maneuvering forces of the aircraft control surfaces.

In order to accomplish such thrust vectoring, a device is required to efficiently and practically alter the direction of gas turbine engine exhaust nozzle gases. Many devices which are well known to those skilled in the art have been developed for the purpose of accomplishing thrust vectoring. Among these devices is an exhaust nozzle employing an upper and a lower flap that are angled simultaneously for the purpose of deflecting exhaust gas in an upward or downward direction. Increasing the angle of the flaps increases the amount of turning that is imparted to the exhaust gas flow. In practice, the flaps are tilted through a relatively small angle, on the order of approximately 20 degrees, for the purpose of the inflight maneuvering, and are tilted to a greater angle, on the order of 40-70 degrees, for the purpose of short takeoff and landing (STOL) applications. While this prior art system has provided a thrust-vectorable nozzle, problems have been encountered in respect to fluid flow within the nozzle because of the location of a minimum flowpath area or throat of the nozzle. In the prior art device, the throat has been located within a fixed duct portion of the nozzle and this is the region where the exhaust gases accelerate from subsonic to supersonic velocities. The upper and lower flaps employed for vectoring of the thrust have been located downstream of the throat area of the nozzle causing the exhaust gases to be turned after they have attained supersonic velocities. This has proved to be an inefficient mode for vectoring of exhaust and, in some configurations, has even created a dual throat nozzle creating conditions of excessive shock sometimes causing harm to nozzle components. While some prior art nozzles have been developed that turn the exhaust gas flow prior to supersonic acceleration, these nozzles generally are either incapable of sufficiently vectoring the exhaust flow to permit STOL operations or have been excessively heavy and cumbersome, particularly for applications in a high performance jet fighter.

SUMMARY OF THE INVENTION

Accordingly, it is an object of the present invention to provide an efficient, lightweight device for vectoring exhaust gas flow of a gas turbine engine wherein turning of the exhaust gas flow is essentially accomplished upstream of a nozzle throat where the exhaust gases are accelerated to supersonic velocities.

It is a further object of the present invention to provide such an exhaust nozzle that is capable of vectoring thrust to sufficient angles to permit short takeoff and landing applications.

These and other objects and advantages will be more clearly understood from the following detailed description, drawings and specific examples, all of which are intended to be typical of, rather than in any way limiting on, the scope of the present invention.

Briefly stated, in one embodiment the above objectives are accomplished in an exhaust nozzle comprising upper and lower variable position flaps. The upper or thrust vectoring flap is pivoted about a downstream portion of a fixed duct at a region of lesser internal flowpath area that forms a nozzle throat when the nozzle is in an unvectored mode. The upper flap is adapted to pivot and thereby turn the exhaust stream gases to selected angles relative to engine axial direction. The lower or control flap is connected to a portion of the fixed duct upstream of the pivot point of the vectoring flap and is progressively angled in cooperation with the vectoring flap to form a variable position throat therebetween when the nozzle is in a thrust vectoring mode. The control flap is adapted to change the position of the throat to be disposed downstream of the exhaust gas turning where the flow attains supersonic velocity.

DESCRIPTION OF THE DRAWINGS

While the specification concludes with claims particularly pointing out and distinctly claiming the subject matter of the present invention, it is believed that the invention will be more fully understood from the following description of the preferred embodiments which is given by way of example with the accompanying drawings, in which:

DESCRIPTION OF THE PREFERRED EMBODIMENT

Figure 1:
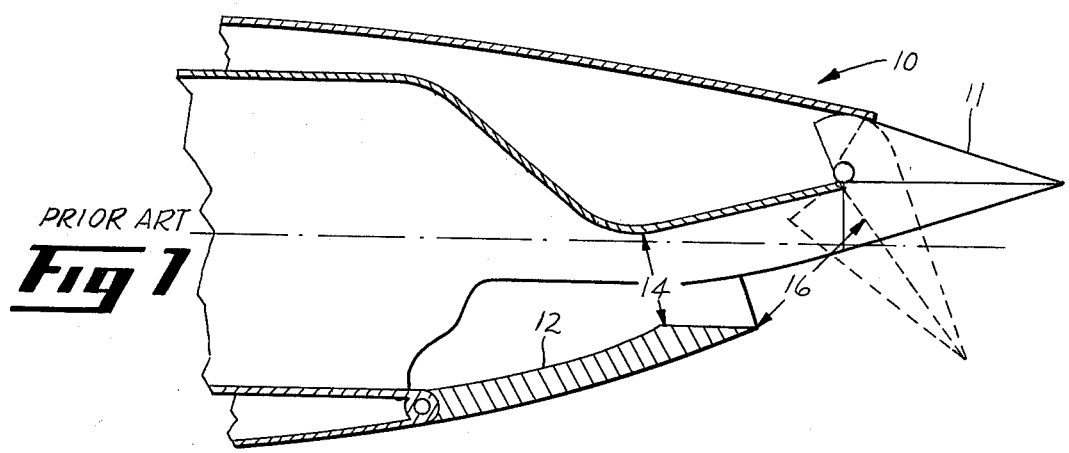
FIG. 1 is a cut-away schematic representation of a prior art vectorable exhaust nozzle.

Referring now to FIG. 1, a prior art exhaust nozzle is shown in a nonvectored position and with a superimposed dashed outline of appropriate nozzle components in a thrust vectoring position. In the nonvectored position, the exhaust gases flowing downstream through the nozzle 10 are accelerated from a subsonic velocity prior to throat position 14 whereupon the gas flow attains Mach 1 and accelerates to supersonic velocities downstream of the throat. The exhaust gases are emitted from the nozzle in an essentially unhindered fashion and provide forward thrust in a direction parallel to the engine axis.

Referring now to the position of the dashed outline nozzle components shown in FIG. 1, a thrust vectored mode is attained by pivoting an upper flap 11, as shown, to cause the exhaust gas flow to be turned in a downward direction thereby causing a thrust vector at an anlge to the engine axis. While the prior art apparatus shown in FIG. 1 may effectively turn or vector the exhaust gas flow through vector angles of 30 degrees or less, testing has shown that the gases are turned or vectored after they have attained supersonic velocity causing excessive drag and creating losses in the production of thrust. In the vectored mode, the exhaust gases flowing within the nozzle 10 experience a minimum flowpath area or throat at position 14 causing the flow to exceed Mach 1 and attain supersonic velocities downstream of position 14. The exhaust flow stream then is turned by the upper flap 11 while the flow is supersonic creating excessive drag. In some embodiments of prior art nozzles, an even more serious condition occurs whereupon the exhaust gas flow may encounter an unstable flow condition caused by the throat shifting rapidly and repeatedly from position 14 to position 16 and back again creating shock waves within the nozzle potentially damaging nozzle components.

Figure 2:
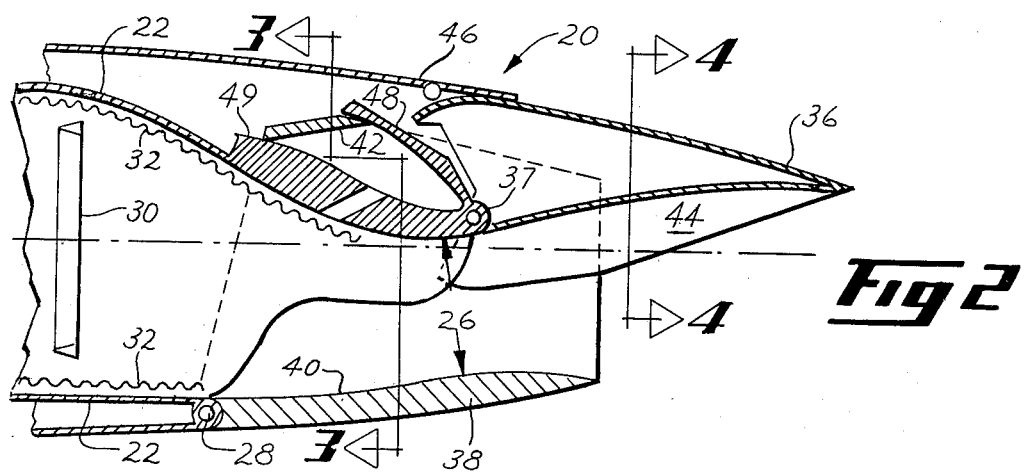
FIG. 2 is a cut-away schematic representation of the present invention.

Referring now to FIG. 2, the present invention is depicted as a nozzle in a nonvectored mode. In this nozzle 20, a fixed duct 22 is formed with an internal flowpath profile that transitions to a rectangular internal profile at its downstream end. As the profile transistions, the internal flowpath of the fixed duct 22 becomes smaller in area as the upper portion of the duct is curved inwardly into the flowpath region. The upper portion of the fixed duct generally extends to a region of minimum flowpath area 26, and the lower half extends to a fixed pivot point 28. If the nozzle 20 employs an afterburner, the transition to a rectangular profile would begin near the plane of flameholders 30. An internal protective cooling liner 32 downstream of the flameholders 30 would be employed to conduct cooling air downstream to hot parts of the exhaust nozzle.

The nozzle 20 employs two major moving parts for the purpose of turning or vectoring the exhaust flow and for the purpose of changing the location of the throat within the internal flowpath of the nozzle. A first of these moving parts is a vectoring flap 36 which forms an articulated exhaust stream deflector extending a downstream portion of an upper wall defining the exhaust stream flowpath and is operatively connected to the fixed duct 22 at pivot point 37. The second of these moving parts is an exhaust stream deflector means or control flap 38 that forms an extension to a lower wall portion of the exhaust stream flowpath and is operatively connected to the fixed duct 22 at the pivot point 28. In the nonvectored mode of the nozzle 20, shown in FIG. 2, the exhaust gases experience a region of minimum flowpath area at 26 whereupon the exhaust gas flowpath attains Mach 1 and continues to expand and accelerate to supersonic velocities downstream of region 26. The vectoring flap 36 and a control flap 38 are in a relative position that does not substantially hinder the expansion of the exhaust gases allowing the flowpath to continue downstream and provide forward thrust in the direction of the engine axis.

To provide a means of controlling exhaust gas pressure the control flap 38 forms a pressure vessel comprised of a lower surface that defines a lower region of the exhaust stream flowpath and an upper surface 42. A pressurized cavity is formed between the upper surface 42 and the fixed duct 22 because of the cooling airflow that is admitted from the cooling liner 32. The force on the upper surface 42 caused by this pressurized cavity offsets or counteracts, to some extent, the exhaust gas load on the lower surface 40 of the control flap 38. This allows the entire control flap 38 to be pivoted with reduced actuation forces thereby lessening the necessity for large and cumbersome actuation mechanisms.

To provide a seal for this pressurized cavity, the upper surface 42 of the control flap 38 is disposed between two internal walls 48 and 49 that are attached to the fixed duct 22 of the nozzle 10. Internal walls 48 and 49 are provided with surfaces forming arcs with common center points corresponding to the pivot point 28 to provide a sealing relationship between the internal walls 48 and 49 and the upper surface 42 throughout movement of the control flap 38 about pivot point 28.

Figure 3:
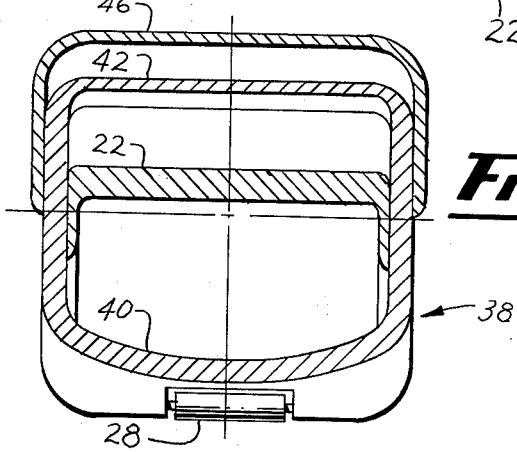
FIG. 3 is a cross-sectional view of a control flap taken along line 3—3 of FIG. 2.

In FIG. 3, a cross-sectional view of the control flap 38 will assist the reader in appreciating how a pressurized vessel is formed by control flap 38. The exhaust gases flow in the space between the lower surface 40 and the fixed duct 22 formed in the lower region of the control flap 38. In the upper region of the control flap 38, the pressurized vessel is formed between the fixed duct 22 and the upper surface 42. It can be readily appreciated how pressure forces from the exhaust gases on the lower surface 40 are offset by pressure forces from the pressurized cavity on the upper surface 42.

Referring again to FIG. 2, the thrust vectoring flap 36 is attached to the fixed duct 22 at the pivot point 37 that is generally located at the region of minimum flowpath area 26. This vectoring flap 36 has a very broadly curved surface for exhaust flow guidance and sidewalls 44 for exhaust flow containment. The vectoring flap 36 is also provided with a flat upper surface to provide a smooth interface with a fixed aircraft top surface 46 over the engine.

Figure 4:
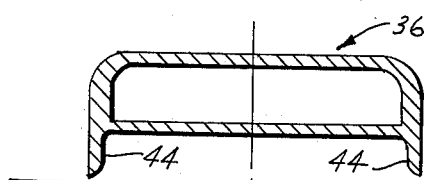
FIG. 4 is a cross-sectional view of a vectoring flap taken along line 4—4 of FIG. 2.

Referring now to FIG. 4, a cross-sectional view of the vectoring flap 36 is shown including the sidewalls 44. It can be readily appreciated that the sidewalls provide some assistance in containing the exhaust gas flowpath.

Figure 5:
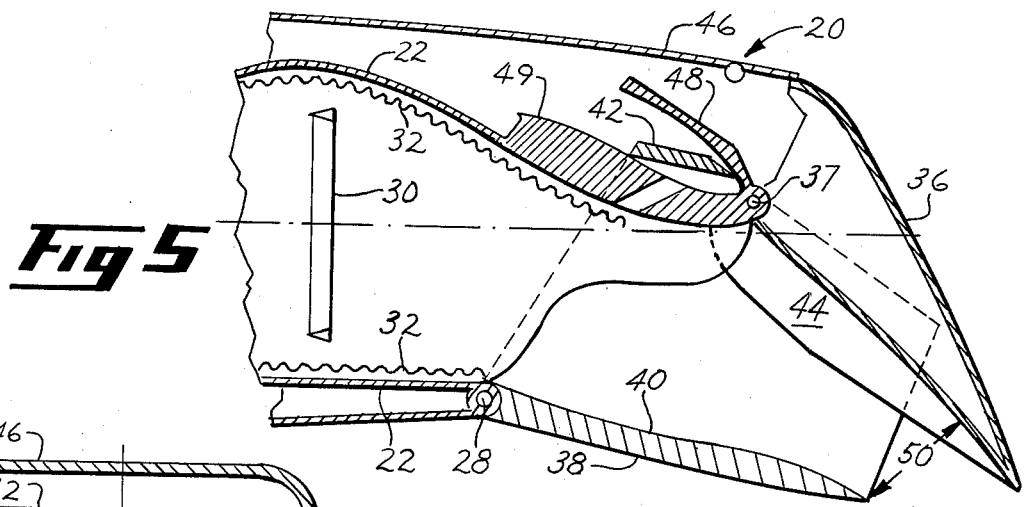
FIG. 5 is a cut-away schematic representation of the present invention employed in a thrust vectoring mode.

Referring now to FIG. 5, the nozzle 20 is shown with flaps 36 and 38 deployed in a thrust vectoring mode. The thrust vectoring flap 36 is actuated independently to provide control of the direction of thrust for all engine power settings in flight operating conditions. In addition, the thrust vectoring flap also provides control of the nozzle area ratio in a manner that is independent of nozzle throat area.

Location of the pivot point 37 for the thrust vectoring flap 36 at the region of minimum flowpath area 26 in the nonvectored mode provides two major advantages not found in combination in prior art exhaust nozzle constructions. First, the location of pivot point 37 results in an apparatus that provides high performance during vectored thrust operation by turning the exhaust gases prior to a newly located nozzle throat 50 where the gases attain supersonic velocities. As shown in FIG. 5, this can be readily appreciated by following the internal flowpath of the gases which are turned initially by the fixed duct 22 and thereafter by the vectoring flap 36. The newly located region of minimum flowpath area is at location of the throat 50 which is well downstream of the region wherein the exhaust gases have been turned to provide vectored thrust. Therefore, the exhaust gases remain subsonic until reaching the throat location 50 and do not attain supersonic velocities until leaving the exhaust nozzle 20 in an already-altered, downward direction.

A second advantage as a result of location of the pivot point 37 is the wide range of thrust vector angles available to the nozzle 20. As shown in FIG. 5, the exhaust gases have been turned to an angle of 60 degrees with respect to engine axis. This vector angle provides increased vertical thrust which is advantageous for short takeoff and landing operation of an aircraft.

In operation, the thrust vectoring flap 36 is positioned at a predetermined angle to achieve a desired thrust vector angle. In cooperation with movement of flap 36, the control flap 38 is positioned to obtain proper exhaust nozzle throat area in a desirable position downstream of the turning or vectoring of the exhaust gases. The combined interaction of the control flap 38 with the vectoring flap 36 allows the nozzle embodiment of the present invention to be employed as both a flight maneuvering exhaust nozzle and additionally as a thrust vectoring nozzle for short takeoff and landing applications with an efficient and lightweight nozzle structure.

While a specific embodiment has been described, it will be apparent to those skilled in the art that various modifications thereto can be made without departing from the scope of the invention, as recited in the appended claims. The scope of the invention, therefore, is to be derived from the following claims.

Having described the invention, what is claimed as novel and desired to be secured by Letters Patent of the United States is:

1. An improved nonaxisymmetric exhaust nozzle for vectoring exhaust gas flow of a gas turbine engine comprising:
   an upper wall partially defining an exhaust stream flowpath;
   a first articulated exhaust stream deflector means forming a downstream portion of the upper wall;
   said deflector means comprising a variable position thrust vectoring flap that pivots about an upstream fixed duct portion at a position along the fixed duct of generally lesser internal flowpath area and is adapted to deflect and turn the exhaust stream to selected angles relative to engine axial direction; and
   a lower wall substantially opposed to the upper wall and further defining the exhaust stream flowpath;
   a second articulated exhaust stream deflector means forming a downstream portion of the lower wall;
   said second deflector means comprising a variable position control flap operatively connected to a fixed duct portion and cooperating with the deflector means to form a variable position throat therebetween wherein said throat is disposed downstream of the exhaust gas turning when the vectoring flap is in a deflecting mode, wherein the improvement comprises:
   an improved control flap having a lower surface defining the exhaust stream flowpath,
   an upper surface exposed to a pressurized cavity for the purpose of allowing pressure forces on said upper surface to offset pressure forces from the exhaust stream on the lower surface thereby forming a pressure vessel within said control flap.

2. The exhaust nozzle recited in claim 1 wherein said thrust vectoring flap and said control flap are pivoted for relative movement in a manner wherein the throat therebetween moves downstream relative to said flaps as deflection from engine axial direction of the exhaust gas increases.

3. The exhaust nozzle recited in claim 1 wherein said upper surface is disposed between opposing surfaces of two internal walls attached to said fixed duct portion, and wherein said opposing surfaces of said walls form arcs with a common center point corresponding to a pivot point of said variable position control flap to provide a sealing relationship between said upper surface and said internal walls throughout movement of said control flap.

4. The exhaust nozzle recited in claim 1 wherein internal flowpath area is appropriately distributed to cause the exhaust gases to remain subsonic throughout exhaust gas turning and to attain supersonic velocity downstream of throat position after turning of the exhaust gases is essentially completed.

5. The exhaust nozzle recited in claim 1 wherein the control flap is pivoted about a point located upstream of the thrust vectoring flap and wherein the flaps are positionable to turn the exhaust gases up to at least 60 degrees relative to engine axial direction.

6. The exhaust nozzle recited in claim 4, wherein said second deflector means that comprises a control flap is further provided with side walls connecting said lower surface and said upper surface, and wherein said side walls form a downstream portion of said exhaust stream flowpath.

* * * * *